Oct. 10, 1967 | A. K. QUINN | 3,346,181
PARALLEL RESISTORS CALCULATOR
Filed Aug. 25, 1966
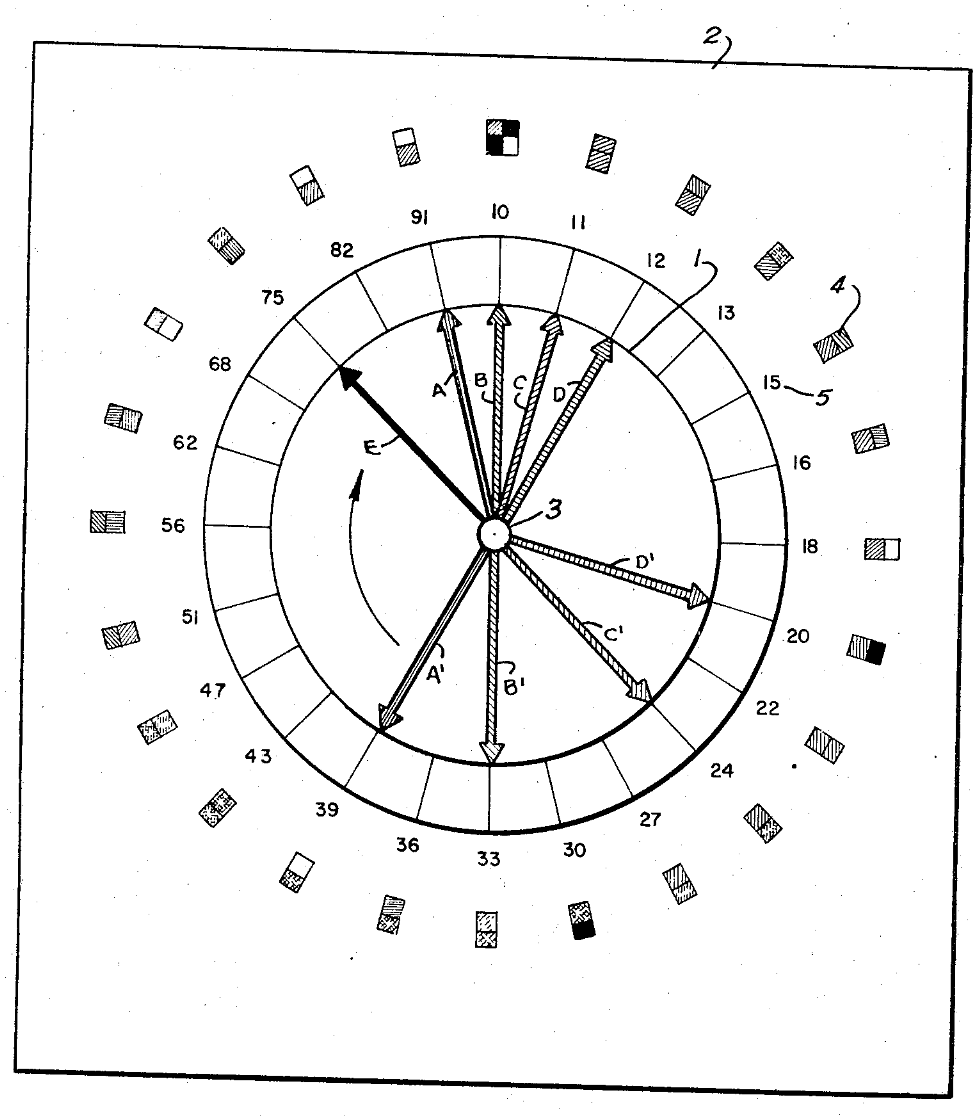
INVENTOR.
ALOYSIUS K. QUINN
BY
Harvey S. Boyd
ATTORNEY United States Patent Office 3,346,181

Patented Oct. 10, 1967

3,346,181

PARALLEL RESISTORS CALCULATOR

Aloysius K. Quinn, 206 Bridlemere Ave., Interlaken, N.J. 07712

Filed Aug. 25, 1966, Ser. No. 575,499
4 Claims. (Cl. 235—84)

ABSTRACT OF THE DISCLOSURE

This invention relates to a calculating device which determines the value of two separate resistors which, in parallel, equal the value of a single resistor. The device consists of two disks superposed on one another. One disk is a base and bears indicia of resistor values logarithmically spaced about the circumference. The other disk is rotatably mounted on the base disk and bears markers.

The invention described herein may be manufactured and used by or for the Government for governmental purposes without the payment to me of any royalty thereon.

Conversely, this invention is capable of determining the value of a single resistor which can be used to replace a pair of resistors in parallel.

It is the principal object of the invention to provide a calculator which is simple to operate and will quickly yield solutions to the above calculations.

The figure shows a plan view of the calculator.

The invention comprises a disc 1 which is surmounted on a base 2 and rotates about axis 3 relative to the base. The base is divided into 24 equal segments. The base bears indicia 4 of known resistor values. These indicia are of a distinctive color scheme and may be in accordance with the standard color code for resistor values. The numerical values 5 of these resistors is also printed beside their corresponding indicia. These values range from 10 ohmic units to 91 ohmic units in correspondingly increasing values in a clockwise direction in a circular pattern on the base of the calculator. These known resistor values are placed 15 degrees apart along 24 equal segments of the base.

The disc 1 surmounted on the base 2 has a reference arrow E and 4 pairs of distinctively, correspondingly marked registration markers having upper arms, or arrows, A, B, C, and D and corresponding lower arms, or arrows, A′, B′, C′, and D′, respectively. The pairs of arrows A, A′; B, B′; C, C′; and D, D′ are drawn or otherwise located on disc 1 so that when the disc is rotated they are always in fixed, relative position. The pair of arrows B, B′ being in a near vertical position are 180 degrees apart. Reference arrow E falls 45 degrees to the left of arrow B, as shown in the figure. Arrow A fall 15 degrees to the left of arrow B. Arrow C is 15 degrees to the right of arrow B, while arrow D is 30 degrees to the right of arrow B. Arrow A′ is 30 degrees to the left of arrow B′. Arrow C′ is 45 degrees to the right of arrow B′, while arrow D′ falls 75 degrees to the right of arrow B′.

With this physical arrangement of the arrows and the known resistor values, the method of using the device requires the following steps. First, set the reference arrow E to the resistor value whose equivalent of parallel pairs is desired. Any one of the pairs of similarly designated arrows, points to parallel equivalent pairs of resistors. For example, as shown in the figure, arrow E points to a resistor whose value is 75. The pair of arrows marked A and A′ point to values of 9.1 and 39, the parallel equivalent pair of 75.

The set of B, B′ arrows points to the values of 10 and 33.

When the arrows pass 10 it is necessary to add a zero to the numerical resistors values. Accordingly, the pair of equivalents for A, A′ becomes 91 and 390; B and B′ becomes 100 and 330. The pair of arrows marked C and C′ point to resistor values of approximately 110 and 240, after adding zero. The arrow pair marked D and D′ point to resistors of approximately 120 and 200, after adding zero.

By setting any one of the pairs of arrows to two known resistor values one can not only arrive at several equivalent sets of resistor pairs in parallel, but also arrive at a single resistor which is equivalent to a pair of resistors in parallel. This is accomplished by setting a single pair of arrows to the corresponding values of known resistors and reading the resistor values which the remaining pairs of arrows define and which arrow E defines.

Thus I have described a calculator which can be utilized to calculate equivalent resistor pairs in parallel.

I claim:

1. A calculating device for determining the values of parallel pairs of resistor equivalents comprising:
   (a) a base member bearing indicia of known resistor values, said indicia being logarithmically spaced circumferentially on said base, the circle thus formed comprising one order of magnitude of the logarthmic scale; and
   (b) a disk rotatably mounted on said base member having a first set of radially disposed opposed registration markers, said markers constituting an upper arm and a lower arm, a radially disposed reference marker positioned 45 degrees to the left of said upper arm whereby when said reference marker is in registry with one of said circumferentially spaced resistor values said first set of markers register with values of resistors when parallelly arranged are equal to the value in registry with said reference marker.

2. The device of claim 1 wherein said disc further includes a second set of radially disposed registration markers said markers constituting an upper arm and a lower arm, said upper arm of said second set positioned 15 degrees left of said upper arm of said first set, said lower arm of said second set positioned 150 degrees to the left of said upper arm of said first set whereby when said reference marker is in registry with one of said circumferentially spaced resistor values said sets of markers register with values of resistors when parallelly arranged are equal to the value in registry with said reference marker.

3. The device of claim 1 wherein said disc further includes a third set of radially disposed registration markers, said markers constituting an upper arm and a lower arm, said upper arm of said third set positioned 15 degrees right of said upper arm of said first set, said lower arm of said third set positioned 135 degrees right of said upper arm of said first set whereby when said reference marker is in registry with one of said circumferentially spaced resistor values said sets of markers register with values of resistors when parallelly arranged are equal to the value in registry with said reference marker.

4. The device of claim 1 wherein said disc further includes a fourth set of registration markers, said markers constituting an upper arm and a lower arm, said upper arm of said fourth set positioned 30 degrees right of said upper arm of said first set, said lower arm of said fourth set positioned 105 degrees right of said upper arm of said first set whereby when said reference marker is in registry with one of said circumferentially spaced resistor values said sets of markers register with values of resistors when parallelly arranged are equal to the value in registry with said reference marker.

References Cited

UNITED STATES PATENTS 2,203,194 6/1940 Frazier ............ 235—84

RICHARD B. WILKINSON, *Primary Examiner.*

LAWRENCE FRANKLIN, *Assistant Examiner.*